H. G. REIST.
BEARING.
APPLICATION FILED OCT. 15, 1914.
1,190,008.
Patented July 4, 1916.
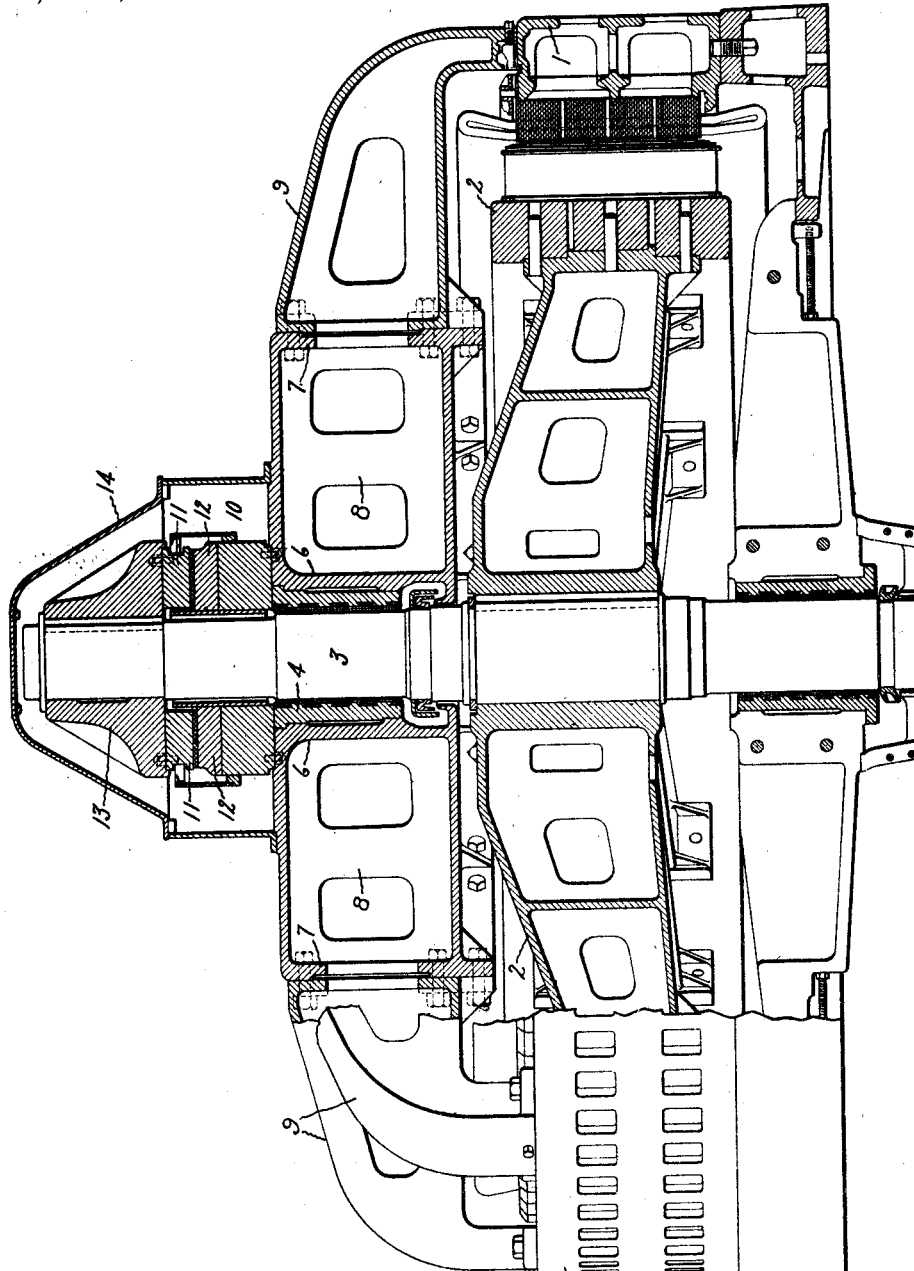
Witnesses
Chas B Stokes
J. Ellis Glen
Inventor:
Henry G. Reist,
by Albert G. Davis
His Attorney.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

BEARING.

1,190,008.　　　Specification of Letters Patent.　　Patented July 4, 1916.

Application filed October 15, 1914. Serial No. 866,851.

*To all whom it may concern:*

Be it known that I, HENRY G. REIST, a citizen of the United States, residing at Schenectady, in the county of Schenectady, State of New York, have invented certain new and useful Improvements in Bearings, of which the following is a specification.

My invention relates to bearings and particularly to bearings for machines of large diameter provided with vertical shafts. Such shafts carry the revolving member of the machine and are supported by thrust bearings which in turn are supported by bearing brackets of large diameter fastened to the stationary members of the machine. It will, therefore, be seen that such bearing brackets act as beams supported at the outside ends on the stationary member and supporting the revolving parts of the machine from the middle of the beam. Heretofore such bearing brackets have been constructed of two or more segments bolted together, because they are of such great size that they cannot otherwise be transported by railroads from the place of manufacture to the place where the machine is to be put into operation. When so constructed the beam consists essentially of two or more parts joined together at the middle, which is the point of greatest stress, and consequently the parts of the bracket as well as the bolts fastening the parts together must be made very heavy.

In accordance with my invention the revolving parts of the machine are supported upon a hub of large diameter which is constructed as a single casting having an inner wall, an outer wall concentric with the inner wall and connected thereto by ribs, and the hub is supported on the stationary member of the machine by means of relatively short brackets or arms which are supported at one end on the stationary frame and at the other end are bolted to the outer wall of the hub. By constructing the bearing brackets in this way, the parts may be made of simple castings, and the joints in the beam are near the ends thereof, the hub being made of as large a diameter as can be conveniently transported. The bearing bracket as a whole may, therefore, be made much lighter than has been possible heretofore.

For a better understanding of my invention reference may be had to the following description taken in connection with the accompanying drawing, in which the single figure is a view, partly in section, of a machine embodying my invention.

In the drawing, I have illustrated my bearing in a dynamo electric machine of large diameter having a stationary member 1, and a revolving member 2 mounted on a vertical shaft 3. The dynamo electric machine shown in the drawing is of the alternating current type having a stationary armature and a revolving field, and is driven by a motor (not shown) of any well known type, connected to the lower end of the shaft. My invention is not limited to dynamo electric machines, however, and may be used in any kind or type of machine of large diameter in which the rotating member is supported on a vertical shaft.

The vertical shaft 3 has a sleeve bearing 4. The bearing bracket hub is made of a single casting having an inner wall 6, and an outer wall 7 concentric with the inner wall, the walls being connected together by strengthening ribs 8. The outer wall 7 may be a many sided polygon or may be cylindrical. This hub supports at its center the sleeve bearing 4 and the thrust bearing 10, both of which may be of any well known type. The bearing bracket arms 9, which join the hub to the stationary member, extend radially from the hub and are secured in position by suitable bolts, being fastened at one end to the outer wall 7 and at the other end to the stationary member 1 of the machine. The hub and the bracket bearing arms together constitute a beam supported at its end on the stationary member and carrying at the middle the weight of the revolving member 2 of the machine. The diameter of the bearing bracket hub is made as large as possible, and since it is a single casting, there are no joints in the beam except where the bearing bracket arms are fastened thereto. These joints, however, are near the ends of the beam, and, therefore, the bearing is of maximum strength with minimum weight. It will also be seen that the bearing bracket hub and the arms are very simple castings.

The thrust bearing 10 which I have shown in the drawing comprises two thrust plates 11 and 12. A flange member 13 is fastened to the shaft 3. The thrust plate 11 is fastened to the flange 13, so that the weight of the shaft and the revolving member comes upon the lower thrust plate 12, which in turn is supported by the bearing bracket hub. The thrust bearing 10 is inclosed by a housing 14 in the customary manner.

What I claim as new and desire to secure by Letters Patent of the United States, is:—

In a machine of large diameter having revolving and stationary members and a vertical shaft on which said revolving member is mounted, a thrust bearing for said shaft and a bearing bracket for supporting said thrust bearing comprising a hub of large diameter formed of a single casting having inner and outer concentric walls connected together by ribs, and bearing bracket arms fastened at one end to the outer wall of said hub and at the other end to said stationary member, said arms extending radially from said hub, whereby said hub and said arms act together as a jointed beam jointed near the ends by which it is supported and carrying at its center the revolving member of said machine.

In witness whereof, I have hereunto set my hand this 14th day of October, 1914.

HENRY G. REIST.

Witnesses:
ANNA McCANN,
BENJAMIN B. HULL.